(12) United States Patent
Strogov et al.

(10) Patent No.: US 11,630,742 B2
(45) Date of Patent: Apr. 18, 2023

(54) SYSTEM AND METHOD OF PERFORMING RECOVERY USING A BACKUP IMAGE

(71) Applicant: Acronis International GmbH, Schaffhausen (CH)

(72) Inventors: Vladimir Strogov, Singapore (SG); Alexey Kostyushko, Yerevan (AM); Alexey Dod, Singapore (SG); Anton Enakiev, Sofia (BG); Serguei Beloussov, Costa del Sol (SG); Stanislav Protasov, Singapore (SG)

(73) Assignee: Acronis International GmbH, Schaffhausen (CH)

( * ) Notice: Subject to any disclaimer, the term of this patent is extended or adjusted under 35 U.S.C. 154(b) by 65 days.

(21) Appl. No.: 16/817,969

(22) Filed: Mar. 13, 2020

(65) Prior Publication Data

US 2020/0310923 A1 Oct. 1, 2020

Related U.S. Application Data

(60) Provisional application No. 62/823,157, filed on Mar. 25, 2019.

(51) Int. Cl.
*G06F 11/14* (2006.01)
*G06F 11/16* (2006.01)
*G06F 11/30* (2006.01)

(52) U.S. Cl.
CPC ...... *G06F 11/1469* (2013.01); *G06F 11/1451* (2013.01); *G06F 11/1461* (2013.01); *G06F 11/1464* (2013.01); *G06F 11/1662* (2013.01); *G06F 11/3034* (2013.01); *G06F 2201/84* (2013.01)

(58) Field of Classification Search
CPC ............. G06F 11/1469; G06F 11/1451; G06F 11/1461; G06F 11/1464; G06F 11/1662; G06F 11/3034; G06F 2201/84; G06F 11/3037; G06F 11/3409; G06F 11/3438
USPC ......................................................... 711/162
See application file for complete search history.

(56) References Cited

U.S. PATENT DOCUMENTS

2004/0163029 A1* 8/2004 Foley ................. G06F 11/1469
714/769
2016/0062853 A1* 3/2016 Sugabrahmam ...... G06F 3/0647
714/4.11

OTHER PUBLICATIONS

Wikipedia "data recovery" page, retrieved from https://en.wikipedia.org/wiki/Data_recovery#Four_phases_of_data_recovery (Year: 2022).*

* cited by examiner

*Primary Examiner* — Yair Leibovich
(74) *Attorney, Agent, or Firm* — ArentFox Schiff LLP; Michael Fainberg

(57) ABSTRACT

Disclosed herein are systems and method for performing recovery using a backup image. In one exemplary aspect, a method comprises scanning a plurality of files on one or more storage devices of a computing device. The method may determine a first set of files from the plurality of files that will be used during recovery of the one or more storage devices, and tag a second set of files that will not be used during recovery. The method may copy the second set of files that have been tagged to an external storage device, and may store the first set of files in a backup image for the computing device (excluding the tagged second set of files from the backup image). The method may add, to the backup image, a respective link to each of the tagged second set of files in the external storage device.

20 Claims, 6 Drawing Sheets

SYSTEM AND METHOD OF PERFORMING RECOVERY USING A BACKUP IMAGE

CROSS-REFERENCE TO RELATED APPLICATIONS

This application claims the benefit of U.S. Provisional Application No. 62/823,157, filed Mar. 25, 2019, which is herein incorporated by reference.

FIELD OF TECHNOLOGY

The present disclosure relates generally to the field of data restoration, and more specifically, to systems and method of performing recovery using a backup image.

BACKGROUND

When an organization or company undergoes recovery (e.g., disaster recovery) across many devices, the speed of recovery is often very slow because of the amount of data that must be recovered for each individual device. The speed of recovery determines how quickly the computer system, server or service can be restored and/or how fast users may access the data and services. It may not be feasible for, for example, a banking or email service to take an excessively long period of time because users may need to quickly access their information for critical or time sensitive activities.

There are many ways to increase the speed of recovery of a failed system. One of the most popular methods used by backup and recovery software is to reduce the amount of data that needs to be restored, where only the most important and critical files, programs, data are restored. Generally, disaster recovery of the operating system and applications is carried out using a backup image, a special archive file that stores all the backup data for the system including all necessary applications and user files.

However, even while attempts have been made to reduce the data in a backup image, often recovery software still tends to restore files or data that is unnecessary for a computer system's initial launch or leave out critical files. Further, the computer system may contain outdated files, so that once the files are restored, they must further be replaced with newer, current versions.

SUMMARY

Aspects of the disclosure relate to the field of data storage and recovery. In particular, aspects of the disclosure describe methods and systems for performing recovery using a backup image.

In one exemplary aspect, a method comprises scanning a plurality of files on one or more storage devices of a computing device. The method may determine a first set of files from the plurality of files that will be used during recovery of the one or more storage devices, and tag a second set of files that will not be used during recovery. The method may copy the second set of files that have been tagged to an external storage device, and may store the first set of files in a backup image for the computing device (excluding the tagged second set of files from the backup image). The method may add, to the backup image, a respective link to each of the tagged second set of files in the external storage device.

In some aspects, the method may retrieve the backup image after an event has occurred for recovery and may restore the first set of files from the backup image to the one or more storage devices.

In some aspects, the method may determine whether a file to be restored is stored in the backup image. In response to determining that the file is not stored in the backup image, the method may retrieve the file from the external storage device and storing it in the one or more storage devices.

In some aspects, the method may determine that a file in the second set of files is accessed during recovery, and may recover the file by replacing the respective link to the file on the one or more storage devices with a copy of the file on the one or more storage devices.

In some aspects, prior to replacing the link the method may submit a synchronization request to a synchronization driver, retrieve a latest version of the file, and copy the latest version of the file to the one or more storage devices.

In some aspects, determining that the file is accessed involves detecting the reading, viewing, or editing of the file.

In some aspects, determining that the first set of files will be used during recovery is performed using a bootloader filter driver and a volume filter driver.

It should be noted that the methods described above may be implemented in a system comprising a hardware processor. Alternatively, the methods may be implemented using computer executable instructions of a non-transitory computer readable medium.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and computer program product of performing recovery using a backup image. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Figure 1:
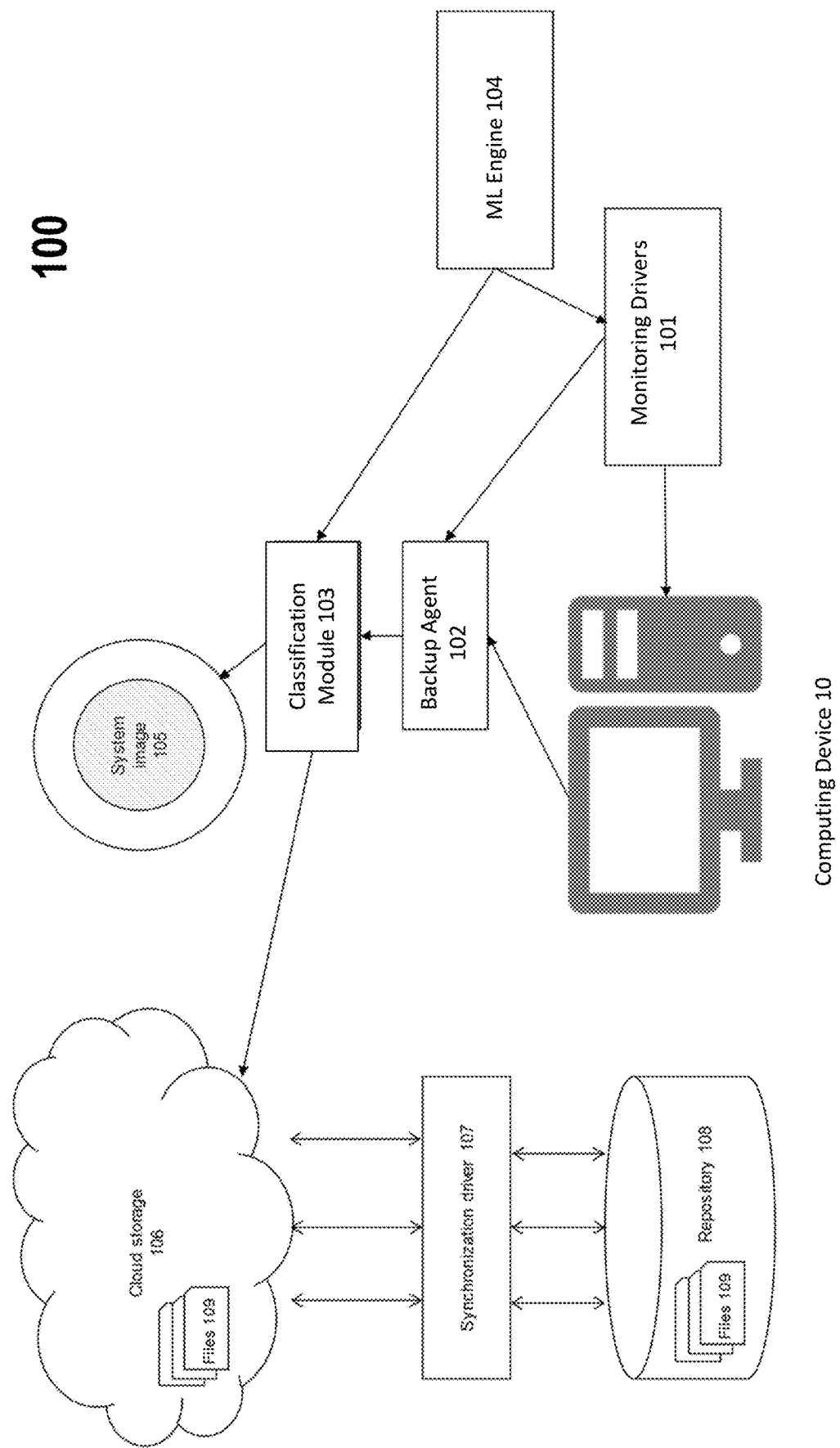
FIG. 1 is a block diagram illustrating a system of performing recovery backup with a backup image, in accordance with exemplary aspects of the present disclosure.

FIG. 1 is a block diagram illustrating a system 100 of performing recovery backup with a backup image, in accordance with exemplary aspects of the present disclosure.

In exemplary aspects, the system 100 comprises a computer system, such as computing device 10, monitoring filter driver(s) 101, a backup agent 102, a classification module 103, an ML engine 104, a cloud storage 106, a synchronization driver(s) 107 and a repository 108.

The computing device 10 may be a server, a workstation, a mobile device such as a smartphone, tablet or the like, that is intended to be restored in case a recovery is needed, for example a disaster recovery. In some aspects, if a device or system failure occurs, some workstations across system 100 of an organization will need to be restored in order to resume operation of the organization. Generally, organizations or companies will only look to restore the most basic and critical operations, servers and workstations in, for example, disaster recovery. Therefore, companies will often have the backup agent 102 installed on each critical computing device, e.g., device 10, and may also include the backup agent 102 on other non-critical devices. In an alternative aspect, the backup agent 102 is a service that executes across all devices in the company across system 100.

The backup agent 102 is either software installed on each device, or a service that operates on each device, either through a client/server process or the like. The backup agent 102 performs backup and restore operations to the various critical workstations and other computing devices. The backup agent 102 may use or invoke various services and components across the system 100 to perform the backup operations.

For instance, the backup agent 102 may use the classification module 103 to classify a series of files 109 associated with the computing device 10. These files 109 may be stored in cloud storage 106, or may be stored on one or more storage devices locally coupled to computing device 10. The backup agent 102 monitors these files and the classification module 103 may determine if the files 109 (or a portion thereof) is needed for recovery, and distributes the files accordingly. The backup agent 102 creates a backup image of the device 10, e.g., a system image 105, that only includes those files needed for recovery at later period of time. In one aspect, the system image 105 includes those files that are necessary for the initial start/boot of the device 10. Accordingly, since the system image 105 only includes files necessary for recovery, the size of the system image 105 is smaller, can be retrieved quickly, and stored efficiently. In some aspects, the system image 105 includes user files and applications that are needed for an initial of device 10 launch during recovery in case of a failure, breakdown, or other event.

The classification module 103 may also determine that a portion of files 109 are not needed for the initial launch after recovery and therefore the files are tagged as optional. Once the backup agent 102 scans these files and sees that they are tagged as optional, the backup agent 102 will not include these optional files in the system image 105, but instead will copy these files 109 to external storage, for example, cloud storage 106. The backup agent 102 will then include links in the system image 105 that link to the copies of the files 109 in the external storage, thereby reducing the size of the system image 105. In exemplary aspects, the classification module 103 may keep a list of optional files, a list of needed files, or a combination of both, either stored as a textual resource somewhere on the network, or stored in a database along with other metadata regarding the scanned files, such as access and modification information. In case the user accesses these linked files during the recovery process (or afterwards), these files will be restored to device 10 from the cloud storage 106 upon request, according to some aspects.

In an exemplary aspect, monitoring filter drivers 101 are installed on the device 10, or in the system 100 on the network, executing as a service, wherein the monitoring filter drivers 101 monitor all the files on the storage devices of the computing device 10. The monitoring filter drivers 101 may also invoke the ML engine 104 that is configured to learn the patterns of accessing the files 109 via the monitoring filter drivers 101. The monitoring filter drivers 101 may be system level drivers installed on the computing device 10 that have access to all read/write/open operations performed on the files. These monitoring filter drivers 101 may include for example a (Unified Extensible Firmware Interface) UEFI bootloader filter driver and a volume filter driver. The ML engine 104 stores, for example in a database, all actions performed on the file to create a historical record and analyzes the historical record to determine how the files 109 are accessed. The analysis of the ML engine 104 may reveal that some files are accessed very often, and therefore they should be included in the system image 105.

In some aspects of the disclosure, during recovery using the system image 105, the backup agent 102 may restore some files that are stored as links in the system image 105, but the files may be out of date, i.e., they are not the latest version of the files. Therefore, the system 100 also includes synchronization drivers 107 that are utilized in updating the files on the device 10. For example, once recovery has completed and the backup agent 102 has restored the system image 105, the synchronization drivers 107 are invoked automatically (e.g., the operating system of device 10 executes synchronization according to a predetermined schedule, or on-demand). The synchronization drivers 107 scan the files 109 that have been restored, extract identifiers (or metadata or other identifying information) for the files, and retrieve the updated versions of the files 109 from the repository 108 using the identifiers (or other identifying information). These files 109 are then updated on the device 10 using the latest versions. In exemplary aspects, the synchronization drivers 107 may be implemented as system level drivers on the device 10. In other aspects, the synchronization drivers 107 are implemented as a network level service in system 100, available to all devices across the network. In exemplary aspects, the repository 108 is a versioning repository that stores one or more versions of a file, and information regarding the hierarchical relationship of files 109. The repository 108 may be queried to retrieve data using identifying information along with version information.

In some aspects, the synchronization drivers 107 may also utilize the ML engine 104 to analyze historical patterns of access of files to determine which files are more commonly accessed after recovery, and update those files to the latest versions sooner than other files that are not commonly accessed. The synchronization drivers 107 may create a tiered schedule of updates according to the conclusions drawn from the ML engine 104, to reduce load following recovery when resources may be scarce or highly taxed.

On a more technical level, the need of a file in files 109 may be defined in many different ways. In some aspects, a user may indicate to the backup agent 102 that a file should be included in a backup. In some aspects, classification module 103 may identify, as needed, all files that are loaded and all processes that are executed from when computing device 10 is first booted until when the boot-up is complete and computing device 10 is idle. Here, idle refers to a point during boot-up when no additional processes/files/applications are automatically loaded by the computing device 10 and a user can access the files, settings, and applications of computing device 10.

In some aspects, classification module 103 may identify, as needed, a threshold number of files (e.g., the first two) that a user has accessed after boot-up has been complete or when the user initiates a usage session. For example, monitoring drivers 101 may generate a list of the first two files/applications that a user accesses during each session of access at computing device 10. In a first session, the user may access file A and application X. In a second session, the user may access file D and application Y. Considering that only those two sessions exists as reference of user activity, monitoring drivers 101 may generate a list featuring file A, the application used to access file A, application X, file D, the application used to access file D, and application Y.

In some aspects, classification module 103 may identify, as needed, all files the user has accessed within a threshold period of time (e.g., 10 minutes) since the boot-up of computing device 10 or when the user initiates a usage session. For example, monitoring drivers 101 may generate a list of all files/applications that a user uses within the threshold period of time during each session. In a first session, the user may access files A, B, C and D within ten minutes of boot-up. In a second session, the user may access application Z. Accordingly, monitoring drivers 101 may generate a list including files A, B, C, and D, the respective applications used to access these files, and application Z.

In some aspects, monitoring drivers 101 may provide its generated list to classification module 103. Classification module 103 may perform an additional layer of filtering. For example, certain files and applications may be outliers that are not necessarily "needed." A user may partake in 100 usage sessions of computing device 10. If an application or file does not appear more than a predetermined number of times in the list (e.g., 50% of the time), the file may be deemed an outlier. For example, of the 100 sessions, a user may access file A (e.g., a Word document) at least 50 times. Accordingly, classification module 103 may classify file A and the application used to access file A (e.g., Microsoft Word) as needed. In contrast, file B may only appear once in the list. In response to determining that file B has not appeared at least 50% of the time in the lists generated by monitoring drivers 101, classification module 103 may determine that file B and the application used to access file B is not needed.

In some aspects, monitoring drivers 101 may generate multiple lists (e.g., files accessed within a threshold period of time, the first files accessed after a usage session is started, files that are updated within a threshold period of time, etc.) and consolidate the list into an input table for ML engine 104. ML engine 104 may be a classification engine trained using a tagged dataset. The dataset may contained identifiers of files and a respective tag on whether the file is needed or not needed. Based on the access history vectors of the files, ML engine 104 may generate a classification vector comprising a plurality of weights. The access history vector for a particular file may, for example, indicate the frequency of access, the number of modifications, the number of times the file has been accessed before any other files, etc. When multiplied by an input vector indicating these attributes for a file in files 109, ML engine 104 may multiply the learned classification vector with the input vector to determine whether the input file is needed or not.

Figure 2:
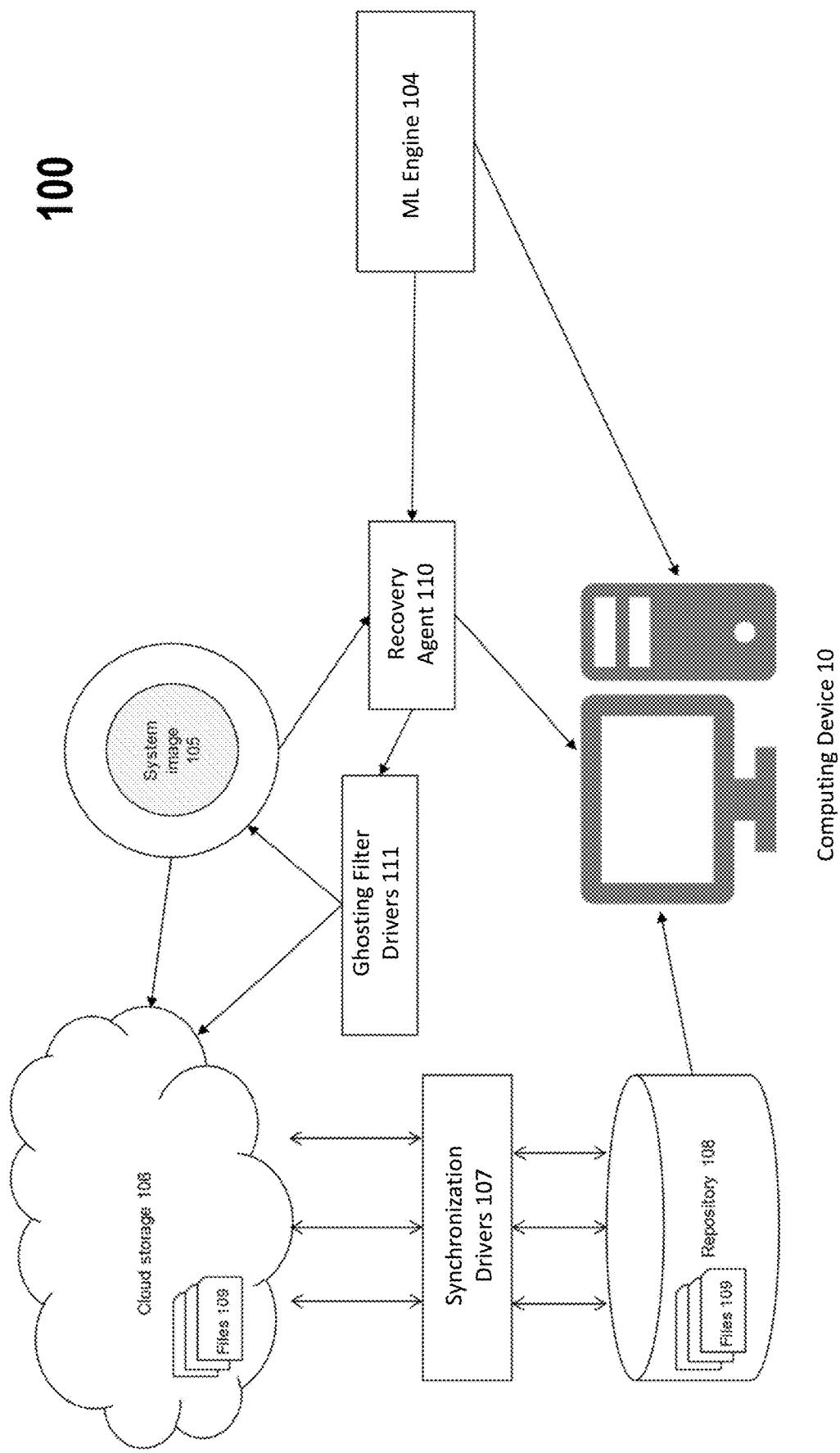
FIG. 2 is a block diagram illustrating another aspect of system of performing recovery using a backup image, in accordance with exemplary aspects of the present disclosure.

FIG. 2 is a block diagram illustrating another aspect of system 100 of performing recovery using a backup image, in accordance with exemplary aspects of the present disclosure.

According to exemplary aspects, the system 100 also comprises a recovery agent 110 and ghosting filter drivers 111. When restoring a device such as the computing device 10 during recovery (e.g., disaster recovery or any other type of recover), the recovery agent 110 retrieves all the necessary data to start the system from a backup image, e.g., system image 105, according to exemplary aspects of the disclosure. In order to track the access to the data that are not in the image, but in the cloud storage such as files 109, ghosting drivers 111 (e.g., a ghosting service) manages redirection processes when links to the files are restored to the device 10, instead of the files themselves.

According to exemplary aspects of the disclosure, ghosting drivers 111 intercept user access requests on device 10 to files. If these files are not in the system image 105, but are located in cloud storage 106, then they are restored to the one or more storage devices of computing device 10 from cloud storage 106 (or alternatively, other external storage).

In exemplary aspects, as the files 109 are received from the cloud storage 106 at device 10 and stored in a temporary location, the recovery agent 110 submits a request to the synchronization driver 107 to perform a forced synchronization of the files. Subsequently, before these files are finally restored by moving them to their final location, they are updated to their latest version and the recovery agent 110 moves these files to their location prior to the crash. In alternative embodiments, the files are updated in place, though other methods and processes are also contemplated.

In some aspects, the machine learning engine 104 may collect additional information about the process such as which files are requested, or the like, during recovery. As explained above, this information can be used by the backup agent 102 and/or the recovery agent 110 to optimize and automate the recovery process for this device 10 or similar devices, in the futures.

In exemplary aspects, the recovery agent 110 is software installed on each device, or a service that operates on each device, through a client/server process or the like. The recovery agent 110 performs restore operations to the various critical workstations and other computing devices. The recovery agent 110 may use or invoke various services and components across the system 100 to perform the restore operations. In exemplary aspects, the recovery agent 110 may comprise a component of the backup agent 102, though the recovery agent 110 may also be a separate process or software installed on the device 10.

Figure 3:
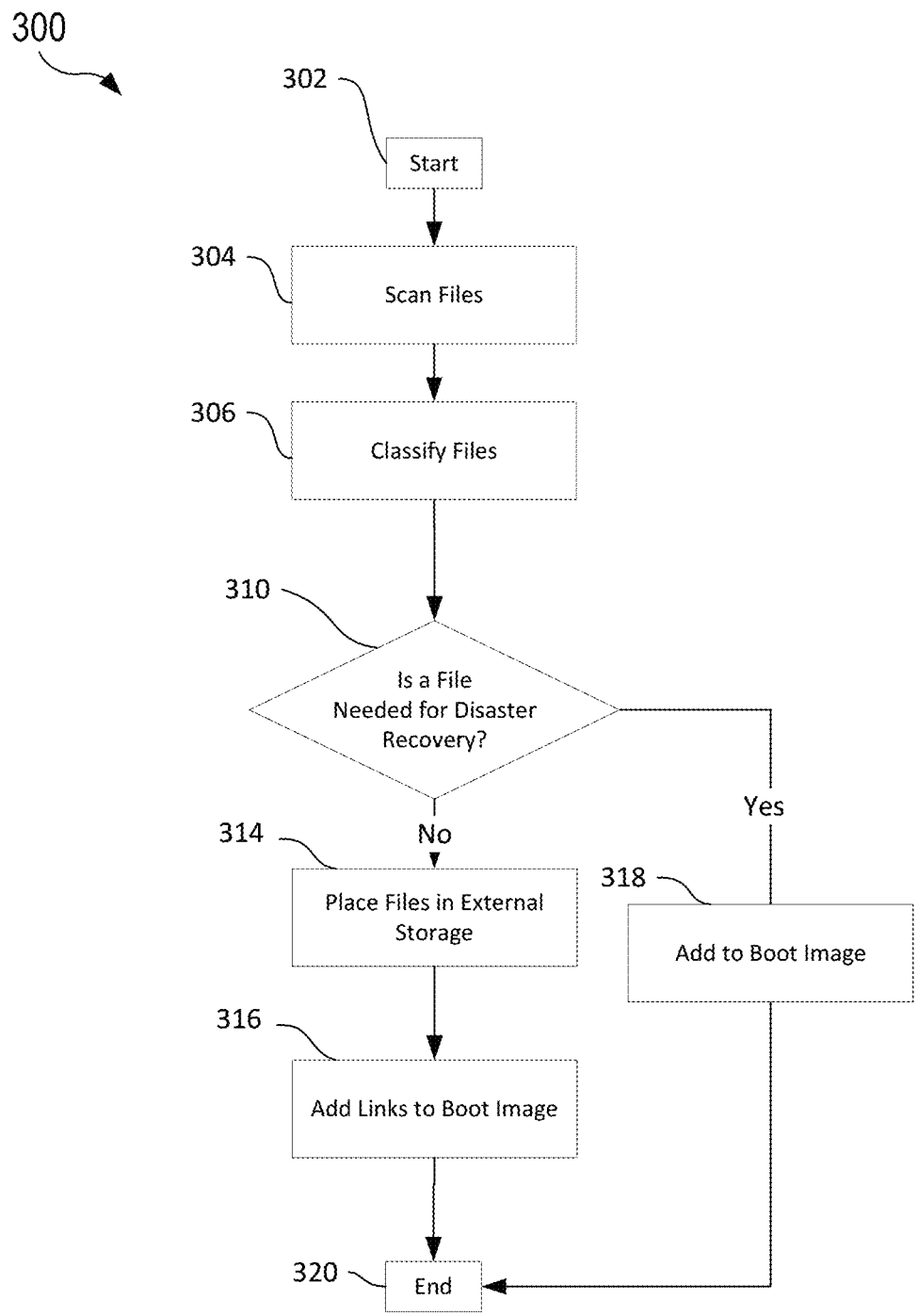
FIG. 3 is a flowchart illustrating a method of performing recovery using a backup image, in accordance with exemplary aspects of the present disclosure.

FIG. 3 is a flowchart illustrating a method 300 of performing recovery using a backup image, in accordance with exemplary aspects of the present disclosure.

The method begins at 302 and proceeds to 304.

At 304, the backup agent 102 performs a scan of all files stored on one or more storage devices of a computing device.

At 306, the backup agent invokes a classification module that classifies the scanned files. The files may be classified as needed for recovery, in case a failure occurs, or as optional for recovery. In some aspects, a file is needed for recovery if it is designated as being needed by a system administrator, a "files needed" record in a file, database or the like, or if it is determined to be a system file associated with an operating system of the computing device. The present disclosure also contemplates other methods that may be used to determine whether a file is needed for recovery such as machine learning, experimentation (e.g., staged recovery tests), and the like. In some aspects, the backup agent may maintain a table of files and their status, or communicate with a database of file identifiers and their status (e.g., necessary or optional).

At 308, the method 300 proceeds to determine whether the scanned files are needed for recovery or not. This may be performed by checking a flag in the database or log file, though other methods are also contemplated herein.

At 310, if the file is determined to be needed by the backup agent, the method proceeds to 318, where the backup agent may add these files to a boot image for recovery. This boot image will be used in case of an emergency so that the computing device can be quickly and conveniently loaded and enabled to serve requests or function as it would function prior to the failure. According to exemplary aspects, the boot image may be any type of boot image recognized by, for example, the backup agent or any standard backup and restore software.

However, if at 310, the file is determined to be optional for recovery, or in other words, recovery can recover to a critical state of the computing device without this particular file, the method proceeds to 314. In exemplary aspects, files can be determined to be optional based on a predetermined list, database entries, or the like, of non-optional files.

At 314, the files that are considered optional are copied to external storage. In some aspects, external storage may be external physical storage disks, cloud storage, or the like.

The method then proceeds to 316, where links to these files in external storage are saved in the backup image. In exemplary embodiments, the links may be any types of links used by known operating systems.

At 320, the method terminates.

Figure 4:
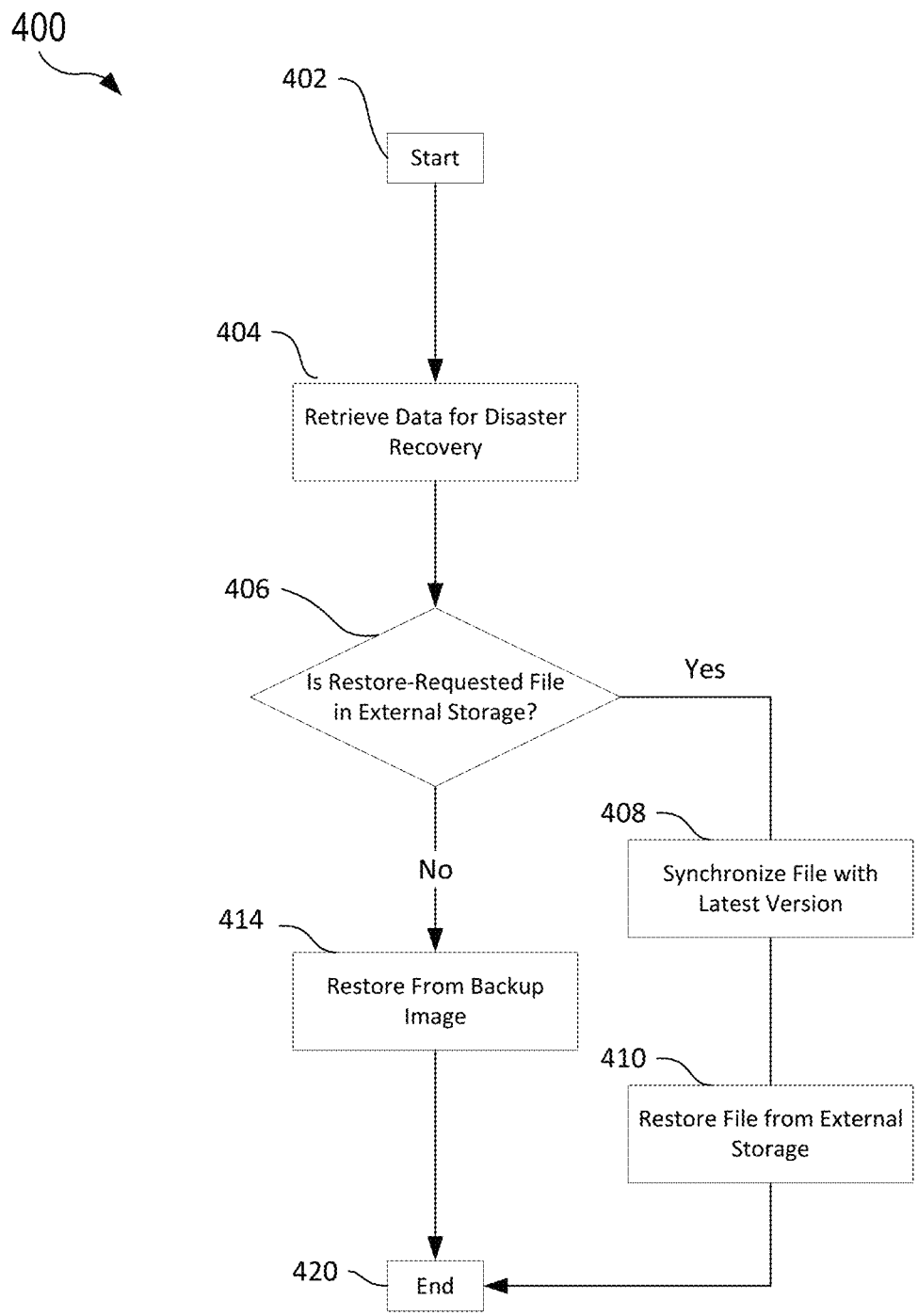
FIG. 4 is a flow diagram illustrating a method for restoring a system during recovery, in accordance with exemplary aspects of the present disclosure.

FIG. 4 is a flow diagram illustrating a method 400 for restoring a system during recovery, in accordance with exemplary aspects of the present disclosure.

The method begins at 402 and proceeds to 404.

At 404, the backup agent retrieves data for recovery. In some aspects, the data may be stored in backup image in external storage, in one of the internal storage devices of the computing device on an isolated partition, in cloud storage, or any combination therein. The data may be stored in one or more backup images, each in a format readable by the backup agent or other standard backup software. In some cases, the backup image may be encrypted.

At 406, the backup agent reads data from the backup image and also monitors requests to the computing device to determine if there are requests for files that are stored in external storage. In other words, these are files that were deemed to be optional to the recovery.

If at 406, the backup agent determines that the file being requested is not in the backup image and that it is in external storage, the method proceeds to 408 where the backup agent invokes the synchronization drivers, in some aspects, to synchronize the requested file with the latest version. For example, the synchronization driver recognizes the file via a file identifier and retrieves the latest version (or a difference between the two files) from a versioning system or the like using the file identifier.

The method 400 proceeds to 410, where the file is then restored, in its current version to the computing system. In some instances, the synchronization driver may only retrieve the differences between the latest version of the file, and the file in external storage and applies the difference to update the file on external storage to the latest version, and then copies the file from external storage to the storage device of the computing device. However, in other aspects, first the file is copied to the storage device of the computing device, and then the latest version is retrieved, though other processes are also contemplated herein.

However, if at 406, the backup agent determines that the request is not for a file on external storage, the method proceeds to 414, where the file is restored from the backup image for recovery.

The method terminates at 420.

Figure 5:
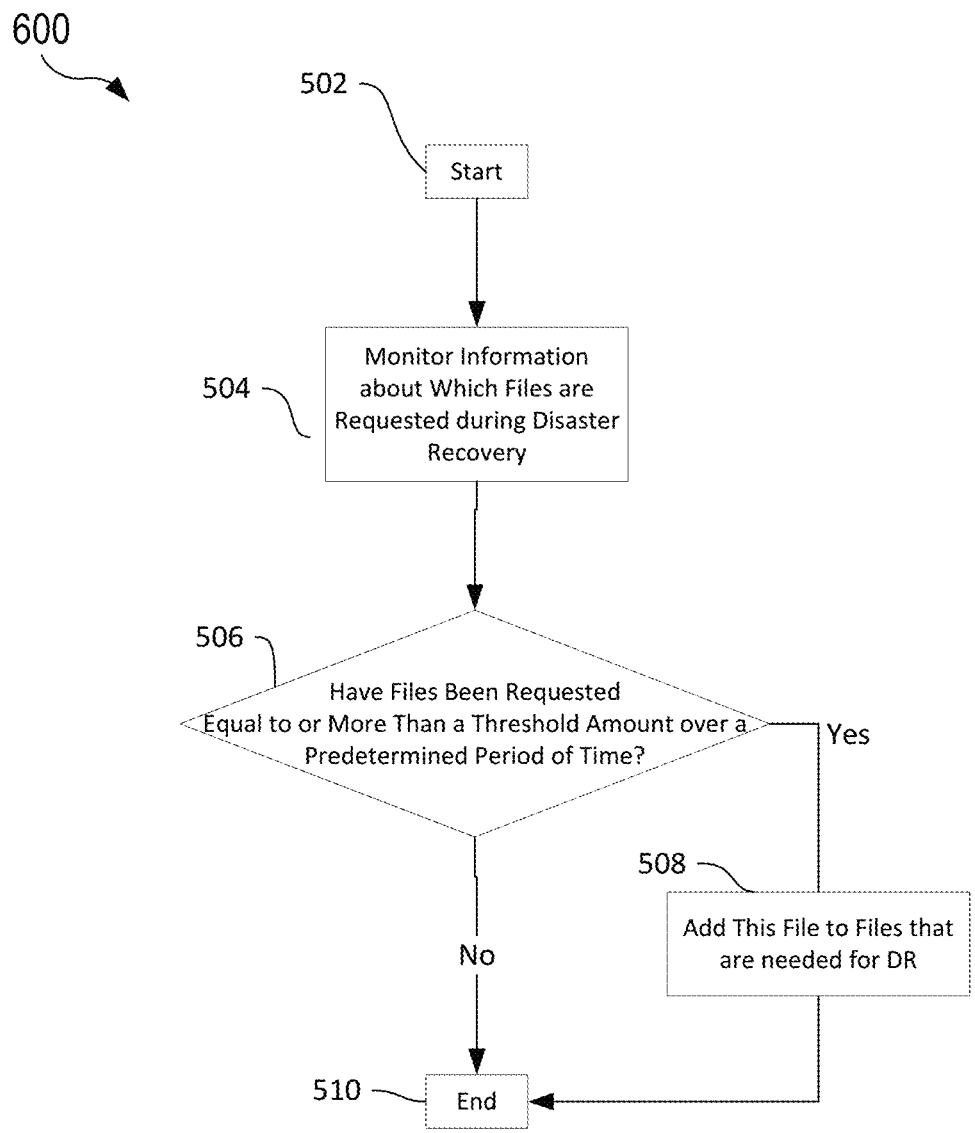
FIG. 5 is a flow diagram illustrating a method for machine learning to assist during recovery, in accordance with exemplary aspects of the present disclosure.

FIG. 5 is a flow diagram illustrating a method 500 for machine learning to assist during recovery, in accordance with exemplary aspects of the present disclosure.

The method 500 begins at 502 and proceeds to 504.

At 504, the ML engine 104 may monitor information about files that are requested during recoveries. For example, there may be several prior instances where a system (e.g., a computing device, a workstation, server or the like) had to be restored in the case of an emergency power outage or the like. The ML engine 104 tracks which files were requested during after the recovery was performed, in order to predict future patterns of file requests.

The method 500 proceeds to 506, where the ML engine 104 may determine whether a currently monitored file has been requested more than threshold amount of times over a predetermined period of time. In some instances, the threshold may be ten times over the period of time including the past three recoveries. Alternatively, at 506, the ML engine 104 may just monitor how many times the file is requested during regular operation of the computing device.

If the file has been accessed equal to or more than the threshold amount of times, the method proceeds to 508, where the file is added to a list of files that are "needed" in recovery. In some embodiments, these files will be included in the backup image when a recovery (DR) backup is performed.

However, if the file has not been accessed the threshold amount of times, the file is not considered "needed" by the recovery, and therefore not added to the backup image when backups are performed. The method 500 moves to 520, where the method terminates.

Figure 6:
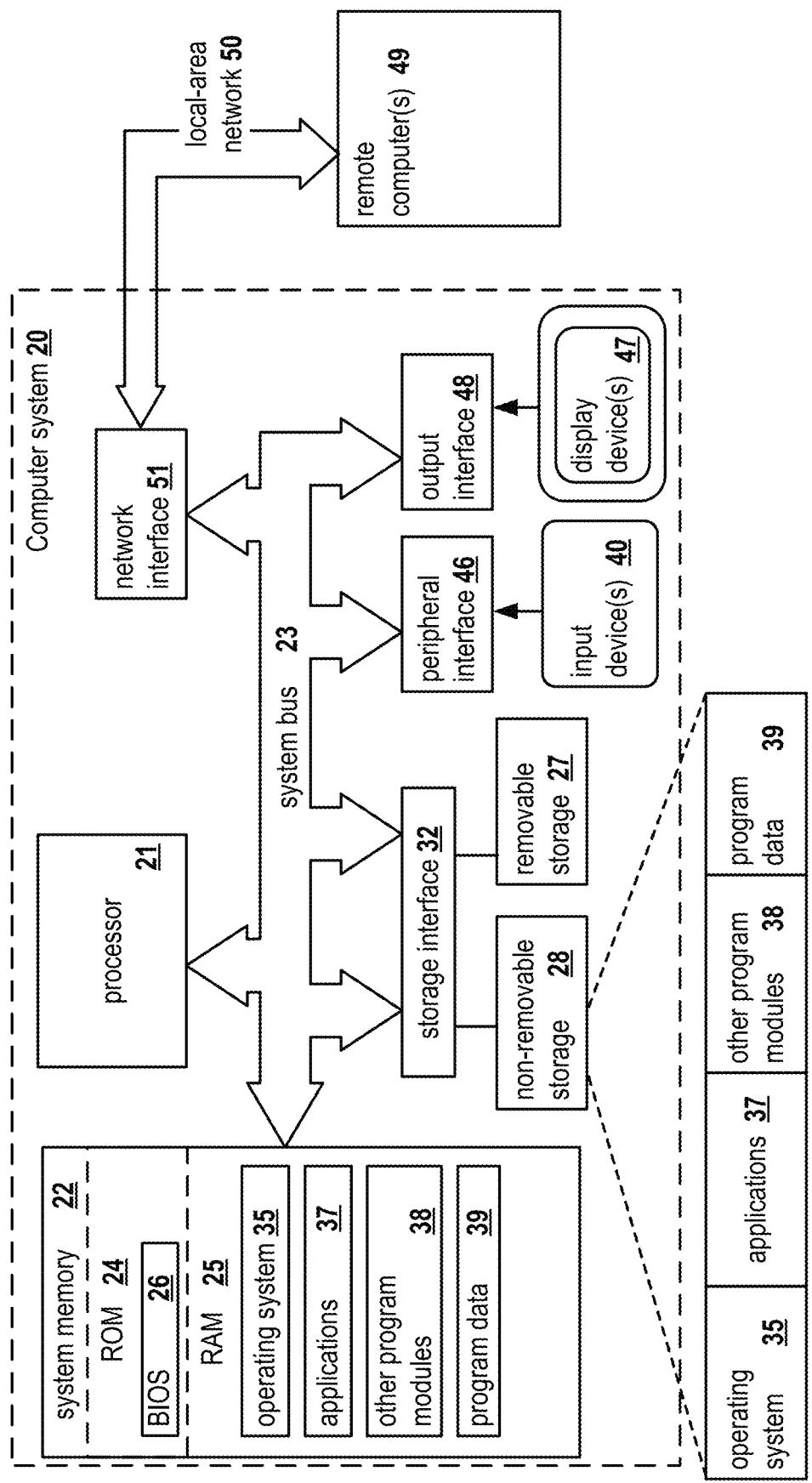
FIG. 6 is a block diagram of a computer system on which the disclosed system and method can be implemented according to an exemplary aspect.

FIG. 6 is a block diagram illustrating a computer system 20 on which aspects of systems and methods of performing recovery using a backup image may be implemented in accordance with an exemplary aspect. It should be noted that the computer system 20 can correspond to any components of the system 100 described earlier. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable codes implementing the techniques of the present disclosure. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computer system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some aspects, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system (such as the one described in greater detail in FIG. 4, above). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed is:

1. A method of performing recovery using a backup image, comprising:
   scanning a plurality of files on one or more storage devices of a computing device;
   determining a first set of files from the plurality of files that will be used during recovery of the one or more storage devices;
   tagging a second set of files that will not be used during recovery;
   copying the second set of files that have been tagged to an external storage device;
   storing the first set of files in a backup image for the computing device and excluding the tagged second set of files from the backup image;
   adding, to the backup image, a respective link to each of the tagged second set of files in the external storage device; and
   subsequent to generating the backup image comprising the first set of files and the respective link to each of the tagged second set of files, performing recovery using the backup image.

2. The method of claim 1, wherein performing recovery comprises:
   retrieving the backup image after an event has occurred for recovery;
   restoring the first set of files from the backup image to the one or more storage devices.

3. The method of claim 1, further comprising:
   determining whether a file to be restored is stored in the backup image;
   in response to determining that the file is not stored in the backup image, retrieving the file from the external storage device and storing it in the one or more storage devices.

4. The method of claim 1, further comprising:
   determining that a file in the second set of files is accessed during recovery; and
   recovering the file by replacing the respective link to the file on the one or more storage devices with a copy of the file on the one or more storage devices.

5. The method of claim 4, further comprising:
   prior to replacing the link, submitting a synchronization request to a synchronization driver;
   retrieving a latest version of the file; and
   copying the latest version of the file to the one or more storage devices.

6. The method of claim 4, wherein determining that the file is accessed includes detecting reading, viewing or editing of the file.

7. The method of claim 1, wherein determining that the first set of files will be used during recovery is performed using a bootloader filter driver and a volume filter driver.

8. A system of performing recovery using a backup image, the system comprising:
   a hardware processor configured to:
      scan a plurality of files on one or more storage devices of a computing device;
      determine a first set of files from the plurality of files that will be used during recovery of the one or more storage devices;
      tag a second set of files that will not be used during recovery;
      copy the second set of files that have been tagged to an external storage device;
      store the first set of files in a backup image for the computing device and excluding the tagged second set of files from the backup image;
      add, to the backup image, a respective link to each of the tagged second set of files in the external storage device; and
      subsequent to generating the backup image comprising the first set of files and the respective link to each of the tagged second set of files, perform recovery using the backup image.

9. The system of claim 8, wherein the hardware processor is further configured to perform recovery by:
retrieving the backup image after an event has occurred for recovery;
restoring the first set of files from the backup image to the one or more storage devices.

10. The system of claim 8, wherein the hardware processor is further configured to:
determine whether a file to be restored is stored in the backup image;
in response to determining that the file is not stored in the backup image, retrieve the file from the external storage device and storing it in the one or more storage devices.

11. The system of claim 8, wherein the hardware processor is further configured to:
determine that a file in the second set of files is accessed during recovery; and
recover the file by replacing the respective link to the file on the one or more storage devices with a copy of the file on the one or more storage devices.

12. The system of claim 11, wherein the hardware processor is further configured to:
prior to replacing the link, submit a synchronization request to a synchronization driver;
retrieve a latest version of the file; and
copy the latest version of the file to the one or more storage devices.

13. The system of claim 11, wherein the hardware processor is further configured to determine that the file is accessed by detecting reading, viewing or editing of the file.

14. The system of claim 8, wherein the hardware processor is further configured to determine that the first set of files will be used during recovery using a bootloader filter driver and a volume filter driver.

15. A non-transitory computer readable medium storing thereon computer executable instructions for performing recovery using a backup image, including instructions for:
scanning a plurality of files on one or more storage devices of a computing device;
determining a first set of files from the plurality of files that will be used during recovery of the one or more storage devices;
tagging a second set of files that will not be used during recovery;
copying the second set of files that have been tagged to an external storage device;
storing the first set of files in a backup image for the computing device and excluding the tagged second set of files from the backup image;
adding, to the backup image, a respective link to each of the tagged second set of files in the external storage device; and
subsequent to generating the backup image comprising the first set of files and the respective link to each of the tagged second set of files, performing recovery using the backup image.

16. The non-transitory computer readable medium of claim 15, wherein an instruction for performing recovery further comprises instructions for:
retrieving the backup image after an event has occurred for recovery;
restoring the first set of files from the backup image to the one or more storage devices.

17. The non-transitory computer readable medium of claim 15, further comprising instructions for:
determining whether a file to be restored is stored in the backup image;
in response to determining that the file is not stored in the backup image, retrieving the file from the external storage device and storing it in the one or more storage devices.

18. The non-transitory computer readable medium of claim 15, further comprising instructions for:
determining that a file in the second set of files is accessed during recovery; and
recovering the file by replacing the respective link to the file on the one or more storage devices with a copy of the file on the one or more storage devices.

19. The non-transitory computer readable medium of claim 18, further comprising instructions for:
prior to replacing the link, submitting a synchronization request to a synchronization driver;
retrieving a latest version of the file; and
copying the latest version of the file to the one or more storage devices.

20. The non-transitory computer readable medium of claim 18, wherein the instructions for determining that the file is accessed includes instructions for detecting reading, viewing or editing of the file.

* * * * *